United States Patent [19]

de Vries

[11] E Re. 28,531

[45] Reissued Aug. 26, 1975

[54] QUICK DRYING ROAD MARKING COMPOSITION AND METHOD

[75] Inventor: Edward R. de Vries, Lebanon, N.J.

[73] Assignee: Prismo Universal Corporation, Rockville, Md.

[22] Filed: June 28, 1974

[21] Appl. No.: 484,315

Related U.S. Patent Documents

Reissue of:

[64] Patent No.: 3,474,057
Issued: Oct. 21, 1969
Appl. No.: 606,023
Filed: Dec. 30, 1966

U.S. Applications:

[63] Continuation-in-part of Ser. No. 262,233, March 1, 1963, abandoned, which is a continuation-in-part of Ser. No. 231,283, Oct. 17, 1962, abandoned.

[52] U.S. Cl. ... 260/22 CB; 117/161 K; 260/31.2 X; 260/32.8 R; 260/33.6 UB; 260/33.6 R; 260/40 R; 260/998.19

[51] Int. Cl.[2] ..... C09D 3/64; C09D 3/66

[58] Field of Search ..... 260/22 CB, DIG. 38; 404/12–14; 117/105.1

[56] References Cited

UNITED STATES PATENTS

| | | | |
|---|---|---|---|
| 2,268,537 | 12/1941 | Shuger | 404/14 |
| 2,330,843 | 10/1943 | Rodli et al. | 404/14 |
| 2,441,101 | 5/1948 | Matthews et al. | 260/31.2 R |
| 2,754,228 | 7/1956 | Bede | 117/105.1 |
| 2,763,575 | 9/1956 | Bede | 117/105.1 |
| 2,834,767 | 5/1958 | Hoyt | 260/87.5 A |
| 3,012,980 | 12/1961 | Dereich | 260/22 CQ |
| 3,326,098 | 6/1967 | Boettler | 117/25 |

OTHER PUBLICATIONS

Paint Industry Technical Yearbook and Materials Manual, 1959, Vol. 4, published by Heckel Publishing Co., Philadelphia, Pa., pp. 212–223.

*Primary Examiner*—Ronald W. Griffin
*Attorney, Agent, or Firm*—Cushman, Darby & Cushman

[57] ABSTRACT

A road marking composition which may be applied to the roadway and used immediately after deposition by traffic which includes particular proportions of specific binders, pigments and solvents of a particular range of pigment volume concentration and solids content.

11 Claims, No Drawings

QUICK DRYING ROAD MARKING COMPOSITION AND METHOD

Matter enclosed in heavy brackets [ ] appears in the original patent but forms no part of this reissue specification; matter printed in italics indicates the additions made by reissue.

---

The present application is a continuation-in-part of applicant's application Ser. No. 262,233, now abandoned, filed Mar. 1, 1963, and entitled, "Reflective Marker," which was a continuation-in-part of application Ser. No. 231,283 filed Oct. 17, 1962, now abandoned.

The present invention relates to reflective markings and more particularly to a reflective highway marker and composition therefor, which shows little or no deformation or smearing of the line by passing vehicles immediately after deposition.

Generally, reflective road markers in the form of traffic paints are combinations of solvent, resinous binder and pigment supplied at a viscosity which is suitable for spraying or brushing. These traffic markers become sufficiently set, to allow traffic to pass over them without deformation or smearing of the line, by evaporation of the solvent alone and subsequent polymerization of the resinous binder by oxidative processes. Some traffic paints set sufficiently by evaporation of solvent only; however, these types use solutions of hard resinous binders which require more solvent to be used to obtain the desired viscosity. This greater solvent volume is often more slowly released from such resins. Both types of these materials require from 15 to 60 minutes before traffic can be safely allowed to run over the markings. This requires the placement of protective markers and later collecting them. This not only seriously restricts traffic flow but adds considerably to the cost of such marking.

Many attempts have been made to reduce the time required before the freshly applied markings could be opened to traffic. The most successful of these involved heating the material to the neighborhood of 160° F. just before application. This allowed the use of less solvent in the base material since the higher temperature had the effect of reducing the viscosity as required for successful application. The lower solvent content yielded a more rapid development of no smear characteristics; however, not so rapid as to obviate the use of the protective cones. The minimum time for no smear achieved by this method was 3 to 5 minutes; however, this is achieved only under ideal conditions, i.e. warm, dry day and using thin films. At normal film thickness as required for reasonable durability (approximately 15 mils wet), at least 5 minutes are required for "track free" conditions under ideal weather conditions by this technique.

A further serious shortcoming of the above, traffic paints, regardless of their composition, is their prolonged time to achieve "track free" condition at night. This is important since areas which are heavily travelled in daytime need to be marked at night to prevent disastrous traffic tie-ups. Protection of the line for long periods at night is difficult and dangerous due to more limited visibility.

It is therefore an object of the present invention to provide a line marking method and composition which enables traffic to pass over the sprayed lines almost immediately after deposition without pick-up, deformation or smearing of the lines regardless of the weather conditions with the single exception of wet surfaces.

It is a further object of the present invention to provide a hot spray quick drying traffic paint.

It is yet another object to provide a composition which can be sprayed on the road in thicker layers and yet will be immediately dry to no track regardless of the weather conditions with the single exception of wet surfaces.

Other objects and the nature and advantages of the instant invention will be apparent from the following description.

It has now been found that traffic paints which meet the above requirements can be prepared by the use of specific ingredients for the solvent, binder and pigments using relatively narrow critical limits of these materials to obtain the desired pigment volume concentration and solids content. The resulting traffic paint when applied according to the method of the present invention will achieve the desired objectives.

The compositions according to the present invention have the following ingredients:

| | Percent by weight |
|---|---|
| Binders | 12–22 |
| Pigments | 50–69.4 |
| Solvents (low boiling) | 7–23 |
| Solvents (higher boiling) | 5–20 |
| Pigment volume concentration | 46–62 |
| Solids content | 70–85 |

The preferred range of ingredients in the compositions as can be verified by the examples in this application is as follows:

| | Percent by weight |
|---|---|
| Binders | 14.0–21.7 |
| Pigments | 50.8–69.4 |
| Solvents (low boiling) | 7.1–16.1 |
| Solvents (higher boiling) | 8.2–18.5 |
| Pigment volume concentration | 46.7–60.1 |
| Solids content | 71.3–83.9 |

The resins which are suitable as binders in the composition are preferably glycerol or other polyfunctional alcohol phthalic alkyds of short and medium oil length which have a polyfunctional alcohol phthalate resin content of 40–58% and an oil content of 60–42%. When using medium oil length alkyds having a polyfunctional alcohol phthalate resin content up to 51.6%, the oils should be selected from a group including linseed, tung, dehydrated castor and oiticica or soybean. Shorter oil lengths of over 51.6% glyceryl phthalate resin content can be based wholly on soybean oil due to the lower oil content. When higher concentrations of oil are present it has been found that soybean oil is not sufficiently conjugated and as a result the composition does not dry quickly enough. The alkyds can be modified with up to 20% by weight of certain hydrocarbon resins or with phenol to make phenolated alkyds. It has also been found that a short oil epoxy ester resin having an acid number less than 2 is also suitable for use as a binder. Short oil urethane esters have also been found to be suitable and to dry in a similar manner to the alkyds. Benzoic acid condensations with polyfunctional alcohols can also be formulated to give suitable results; however, such systems are somewhat brittle. Styrene butadiene or vinyl toluene-butadiene copolymers represent a binder which dries by solvent evaporation only which is useful in connection with this invention; however, it must be used without the chlorinated plasticizers normally associated with these resins since such plasticizers affect solvent release properties adversely.

The solvents used are a combination of a low boiling and a higher boiling solvent. The lower boiling solvent or combination of solvents has its boiling range below the temperature at which the material is to be sprayed. This solvent or solvent combination is prevented from evaporating or boiling due to the pressure in the system. Upon release of the pressure at the spray orifice this solvent is largely flashed out in the form of vapor. This flashing out of the solvents results in (a) breaking up the material in the form of fine droplets due to the sudden boiling out of this solvent component, (b) cooling the remaining material rapidly due to the loss of the heat of vaporization as well as the heat absorbed by the expanding atomizing air, and (c) increasing the consistency of the material to a consistency approaching a track free state before it hits the surface due to the cooling effect and the loss of the low boiling, high solvency, solvent. The other important function of this solvent or solvent combination is to reduce the viscosity of the resin-pigment combination so that it can be pumped from its container with available equipment while maintaining its high solids content. The required characteristics of this part of the solvent in the composition are: (a) high solvency for the resins used and (b) boiling point(s) below the spraying temperature. Suitable solvents are cyclohexane, pentane, petroleum ether, iso-hexane, hexane, methylene chloride, chloroform, carbon tetrachloride, ethylene dichloride, trichloroethylene, acetone, methyl ethyl ketone, ethyl acetate, isopropyl acetate, benzene and the like. The preferred solvents are those that are chlorinated because of their high or lack of flash point. Of these methylene chloride is the most satisfactory because of its low toxicity, low boiling point and rapid reduction of viscosity of most resins.

The second portion of the solvent or solvent combination has the function of providing sufficient tack and flow to the pigment resin combination after it reaches the road surface to (a) adhere to the surface on which it is applied, (b) incorporate and bind to glass spheres which may be added to obtain night visibility, and (c) from a smooth continuous line. This solvent should also be such that it will evaporate from the line marker quickly. This is accomplished by using a fair to poor solvent for the resin and one which has a preferred boiling range between 200° F. and 300° F. A portion may have a boiling point as high as 400° F. if it is very poor solvent for the resin. For example, if the resin is a medium oil phthalic alkyd (47% glyceryl phthalate, 53% oil) the solvent should be a mixture of aliphatic hydrocarbons within the boiling range containing not more than 20% aromatic hydrocarbons and a kauri-butanol value of less than 50. Shorter oil phthalic alkyds (57% glyceryl phthalate, 43% oil), epoxy esters and the like can be used with aromatic solvents within the boiling range, such as toluene or xylene, since such binders require higher K-B solvents for solution.

The third basic part of the composition, the pigmentation, is also critical with respect to the achievement of the objects of the invention. This is particularly true with respect to the extenders or low refractive index pigments. The pigments which are suitable for developing the opacity and/or color to the marking material are the same as those traditionally used in such markers, i.e. rutile and anatase titanium dioxide, chrome yellow (lead chromate), carbon black, and the like. The pigments used of this type should be free of any treatment designed to improve the dispersion characteristics of the pigment since such treatments were found to adversely affect the "no track" time in compositions of this invention. The composition of this invention requires that the major portion of the volume of the pigmentation be one or a combination of ground silica, natural clay, calcined clay, and calcium sulfate. Further, the silica must have at least 50% of its particles finer than 3 microns with at least 80% of its particles within 5 microns of size distribution. The natural and calcined clays should have at least 50% of their particles finer than 5 microns. Calcium sulfate pigments should be at least 80% within a range of 0.4 to 0.8 microns. Generally, the most suitable pigments are those which are not strongly wetted by the binder and which have their average particle size in the vicinity of 1.5 microns. Pigments significantly finer than this have such high oil adsorption that they require such high binder and solvent concentrations that their "no track" time does not meet the objectives of this invention as the major pigment component. Coarser and more easily wet pigments also do not meet the requirements regardless of other formulation variables. Other types of extender (low refractive index) pigments can be used in small quantities providing the above pigments represent at least 50% of the total volume of the pigment. Representatives of these other types are calcium carbonate (whiting), magnesium silicate (talc), mica, and the like.

These pigments contribute importantly to this invention in that they are of a size, shape and have surface characteristics such that when in close proximity to each other they developed high dilatancy and microporosity. Thus, when deposited on the substrate with little solvent remaining in the material, a passing wheel will impart a force which causes the apparent viscosity of the system to be extremely high. Further, its microporous structure allows the remaining solvent to escape rapidly. Calcined clays give the best results because their cinder-like particles tend to lock together when they are in close proximity and under stress.

Each specific pigment combination has a corresponding optimum pigment volume concentration. Below this level the time for no tracking characteristics increases rapidly and above this optimum the durability characteristics shows rapid deterioration, loss of adhesion, inability to hold glass spheres used as retroreflective elements, and dirt penetration into the film due to excessive porosity. The "no track" time for these systems is determined by casting a 15 mil wet film of the composition and testing by the method described in A.S.T.M. Designation 711–55. A result of 6 minutes or less by this test will generally have a no track time of one minute or less when applied and compounded according to the teachings of the invention. Examples of the variation of "no track" time with pigment volume concentration of some pigments with a fixed volume of hiding pigments in a representative binder as described in the invention are given below:

These examples illustrate the characteristics of those pigments which are suitable for use in this invention compared with those which are unsatisfactory.

| Pigment | Pigment Volume Concentration, percent | No Track Time |
|---|---|---|
| Silica-1.5 microns | 50 | 11 |
| | 55 | 7 |
| | 60 | 5 |
| | 65 | 4 |
| | 70 | 3 |
| Silica-10 microns | 50 | 28 |
| | 55 | 22 |
| | 60 | 22 |
| | 65 | 20 |
| | 70 | 17 |
| Magnesium silicate-5 microns | 50 | 17 |
| | 55 | 15 |
| | 60 | 10 |
| | 65 | 15 |
| | 70 | 20 |
| Calcium carbonate-5 microns | 50 | 30 |
| | 55 | 23 |
| | 60 | 18 |
| | 65 | 15 |
| | 70 | 15 |
| Calcined clay-1.5 microns | 35 | 12 |
| | 40 | 8 |
| | 45 | 7 |
| | 50 | 5 |
| | 55 | 3 |
| | 60 | 1 |

The composition in accordance with the present invention is handled for application by first pumping the material directly from its container into a closed system maintained at a fluid pressure of 100 to 150 pounds per square inch. The material is passed through a heat exchanger and heated lines. This increases its temperature to a range between 140° F. to 250° F. The most practical temperature was found to be 160° F.±10° F. The heated material is then released from a spray orifice and is further broken up by auxiliary air pressure.

The preferred viscosity of the composition of this invention should be as high as practical. The higher the viscosity the higher the solids of the composition and the closer it is to its no track state. A practical limitation of handling the composition in cold weather is viscosity. The minimum viscosity found which would allow the desired results to be obtained is approximately 80 Krebs units.

The following specific examples of formulations in accordance with this invention are illustrative only and should not be construed as limiting the scope of the invention.

EXAMPLE 1

| Material: | Percent by weight |
|---|---|
| Binder-Glycerol-phthalic alkyd (47% glyceryl phthalate-53% oil) (oil-75% soya-25% Chinawood) | 17.1 |
| Pigments: | |
| Rutile titanium dioxide | 9.9 |
| Calcium sulfate (0.6 micron) | 23.0 |
| Ground silica (1.5 micron) | 26.3 |
| Magnesium silicate (talc) | 3.3 |
| Solvents: | |
| Aliphatic hydrocarbon (15% aromatic, IBP 250°F., EP 285°F., KB 40) | 9.4 |
| Methylene chloride | 9.4 |
| Additives-Driers and additives | 0.5 |

This formulation yielded a white paint having a pigment volume concentration of 58.3 and a solids content of 80.1%.

EXAMPLE 2

| Material: | Percent by weight |
|---|---|
| Binder-Glycerol-phthalic alkyd (47% glyceryl phthalate-53% oil) (oil 75% soya-25% Chinawood) | 17.7 |
| Pigments: | |
| Chrome yellow medium (lead chromate) | 10.2 |
| Ground silica (1.5 micron) | 47.6 |
| Magnesium silicate (talc) | 3.4 |
| Solvents: | |
| Aliphatic hydrocarbon (15% aromatic, IBP 250°F., EP 285°F., KB 40) | 10.9 |
| Methylene chloride | 9.7 |
| Additives-Driers and additives | 0.5 |

This formulation yielded a yellow paint having a pigment volume concentration of 56.7 and a solids content of 79.4%.

EXAMPLE 3

| Material: | Percent by weight |
|---|---|
| Binder-Glycerol-phthalic alkyd (47% glyceryl phthalic alkyd (47% glyceryl phthalate-53% oil) (oil-75% soya-25% Chinawood) | 16.9 |
| Pigments: | |
| Carbon black (pigment grade | 1.6 |
| Ground silica (1.5 microns) | 52.0 |
| Magnesium silicate (talc) | 6.5 |
| Solvents: | |
| Aliphatic hydrocarbon (15% aromatic, IBP 250°F., EP 285°F., KB 40) | 10.4 |
| Methylene chloride | 12.2 |
| Additives-Driers and additives | 0.4 |

This formulation yielded a black paint having a pigment volume concentration of 60.1 and a solids content of 77.4%.

EXAMPLE 4

| Material: | Percent by weight |
|---|---|
| Binder-Glycerol phthalic alkyd (47% glyceryl phthalic alkyd (47% glyceryl phthalate-53% oil) (10% Chinawood-90% soya) | 18.0 |
| Pigments: | |
| Rutile titanium dioxide | 10.4 |
| Calcium sulfate (0.6 micron) | 24.3 |
| Natural clay | 24.3 |
| Magnesium silicate | 3.5 |
| Solvents: | |
| Aliphatic hydrocarbon (15% aromatic, IBP 250°F., EP 285°F., KB 40) | 10.5 |
| Methylene chloride | 8.4 |
| Additives-Driers and additives | 0.6 |

This formulation has a pigment volume concentration of 56.7% and a solids content of 81.1%.

EXAMPLE 5

| Material | Percent by weight |
|---|---|
| Binder-Glycerol phthalic alkyd (47% glyceryl phthalic alkyd (47% glyceryl phthalate-53% oil) (10% Chinawood-90% soya) | 18.0 |
| Pigments: | |
| Rutile titanium dioxide | 10.4 |
| Natural clay | 48.6 |
| Magnesium silicate | 3.5 |
| Solvents: | |
| Aliphatic hydrocarbon (15% aromatic, IBP 250°F., EP 285°F., KB 40) | 10.5 |

-Continued

| | |
|---|---|
| Methylene chloride | 8.4 |
| Additives-Driers and additives | 0.6 |

This formulation has a pigment volume concentration of 58.0% and a solids content of 81.1%.

EXAMPLE 6

| Material: | Percent by weight |
|---|---|
| Binder-Glycerol phthalic alkyd (47% glyceryl phthalic alkyd (47% glyceryl phthalate-53% oil) (10% Chinawood-90% soya) | 21.7 |
| Pigments: | |
| Rutile titanium dioxide | 15.2 |
| Calcined clay (1.5 microns) | 35.6 |
| Solvents: | |
| Aliphatic hydrocarbon (15% aromatic, IBP 250°F., EP 285°F., KB 40) | 15.7 |
| Methylene chloride | 11.0 |
| Additives-Driers and additives | 0.8 |

This formulation has a pigment volume concentration of 46.7% and a solids content of 73.3%.

EXAMPLE 7

| Material: | Percent by weight |
|---|---|
| Binder-Glycerol phthalic alkyd (47% glyceryl phthalic alkyd (47% glyceryl phthalate-53% oil) (10% Chinawood-90% soya) | 19.8 |
| Pigments: | |
| Rutile titanium dioxide | 13.8 |
| Calcined clay (1.5) microns) | 41.5 |
| Solvents: | |
| Aliphatic hydrocarbon (15% aromatic, IBP 250°F., EP 285°F., FB 40) | 14.2 |
| Methylene chloride | 10.0 |
| Additives-Driers and additives | 0.7 |

This formulation has a pigment volume concentration of 51.6% and a solids content of 75.8%.

EXAMPLE 8

| Material: | Percent by weight |
|---|---|
| Binder-Glycerol phthalic alkyd (47% glyceryl phthalic alkyd (47% glyceryl phthalate-53% oil) (10% Chinawood-90% soya) | 19.8 |
| Pigments: | |
| Rutile titanium dioxide | 13.8 |
| Natural clay | 41.5 |
| Solvents: | |
| Aliphatic hydrocarbon (15% aromatic, IBP 250°F., EP 285°F., KB 40) | 14.2 |
| Methylene chloride | 10.0 |
| Additives-Driers and additives | 0.7 |

This formulation has a pigment volume concentration of 51.9% and a solids content of 75.8%.

EXAMPLE 9

| Material: | Percent by weight |
|---|---|
| Binder-Glycerol phthalic alkyd (47% glyceryl phthalic alkyd (47% glyceryl phthalate-53% oil) (10% Chinawood-90% soya) | 20.0 |
| Pigments: | |
| Rutile titanium dioxide | 11.6 |
| Natural clay | 40.9 |
| Magnesium silicate | 3.9 |
| Solvents: | |
| Aliphatic hydrocarbon (15% aromatic, IBP 250°F., EP 285°F., KB 40) | 11.7 |
| Methylene chloride | 11.3 |
| Additives-Driers and additives | 0.6 |

This formulation has a pigment volume concentration of 52.5% and a solids content of 77.0%.

EXAMPLE 10

| Material: | Percent by weight |
|---|---|
| Binder-Glycerol phthalic alkyd (47% glyceryl phthalate-53% oil) (10% Chinawood-90% soya) | 18.6 |
| Pigments: | |
| Rutile titanium dioxide | 11.9 |
| Natural clay | 42.2 |
| Magnesium silicate | 4.0 |
| Solvents: | |
| Aliphatic hydrocarbon (15% aromatic, IBP 250°F., EP 285°F., KB 40) | 10.0 |
| Methylene chloride | 10.6 |
| Additives: | |
| Coumaron-indene hydrocarbon resin modifier (M.P. 200-220°F., iodine value 230 heat reactive Sap. No. 0-2 Acid No. 0-2) | 2.1 |
| Driers and additives | 0.6 |

This formulation has a pigment volume concentration of 55.0% and a solids content of 79.4%.

EXAMPLE 11

| Material: | Percent by weight |
|---|---|
| Binder-Glycerol phthalic alkyd (47% glyceryl phthalate-53% oil) (10% Chinawood-90% soya) | 17.1 |
| Pigments: | |
| Rutile titanium dioxide | 12.3 |
| Natural clay | 43.5 |
| Magnesium silicate | 4.1 |
| Solvents: | |
| Aliphatic hydrocarbon (15% aromatic, IBP 250°F., EP 285°F., KB 40) | 9.2 |
| Methylene chloride | 8.8 |
| Additives: | |
| Coumaron-indene hydrocarbon resin modifier M.P. 200-220°F., iodine value 230 heat reactive Sap No. 0-2 Acid No. 0-2) | 4.3 |
| Driers and additives | 0.7 |

This formulation has a pigment volume concentration of 57.8 and a solids content of 82.0.

EXAMPLE 12

| Material: | Percent by weight |
|---|---|
| Binder-Glycerol phthalic alkyd (57% glyceryl phthalate-43% soya oil) | 19.0 |
| Pigments: | |
| Rutile titanium dioxide | 10.9 |
| Natural clay | 38.6 |
| Magnesium silicate | 3.6 |
| Solvents: | |
| Xylene | 12.6 |
| Methylene chloride | 14.7 |
| Additives-Driers and additives | 0.6 |

This formulation has a pigment volume concentration of 53.2 and a solids content of 72.7.

EXAMPLE 13

| Material: | Percent by weight |
|---|---|
| Binder-Glycerol phthalic alkyd (50% glyceryl phthalate-50% dehydrated castor oil) | 18.5 |
| Pigments: | |
| Rutile titanium dioxide | 10.7 |
| Natural clay | 37.8 |
| Magnesium silicate | 3.6 |
| Solvents: | |
| Aliphatic hydrocarbon (15% aromatic, IBP 250°F., EP 285°F., KB 40) | 18.5 |
| Methylene chloride | 10.2 |
| Additives-Driers and additives | 0.7 |

This formulation has a pigment volume concentration of 51.6 and a solids content of 71.3.

EXAMPLE 14

| Material: | Percent by weight |
|---|---|
| Binder-Glycerol phthalic alkyd (48% glycerol phthalate-52% linseed oil) | 18.5 |
| Pigments: | |
| Rutile titanium dioxide | 10.7 |
| Natural clay | 37.8 |
| Magnesium silicate | 3.6 |
| Solvents: | |
| Aliphatic hydrocarbon (15% aromatic, IBP 250°F., EP 285°F., KB 40) | 18.5 |
| Methylene chloride | 10.2 |
| Additives-Driers and additives | 0.7 |

This formulation has a pigment volume concentration of 54.6 and a solids content of 71.3.

EXAMPLE 15

| Material: | Percent by weight |
|---|---|
| Binder-Glycerol phthalic alkyd (50% glyceryl phthalate-50% DCO) (dehydrated castor oil) | 18.5 |
| Pigments: | |
| Rutile titanium dioxide | 10.7 |
| Natural clay | 37.8 |
| Magnesium silicate | 3.6 |
| Solvents: | |
| Aliphatic hydrocarbon (15% aromatic, IBP 250°F., EP 285°F, KB 40) | 18.5 |
| Methylene chloride | 10.2 |
| Additives-Driers and additives | 0.7 |

This formulation has a pigment volume concentration of 54.6 and a solids content of 71.3.

EXAMPLE 16

| Material: | Percent by weight |
|---|---|
| Binder-Glycerol phthalate alkyd (47% glyceryl phthalate-53% oil) (10% Chinawood-90% soya) | 14.0 |
| Pigments | |
| Rutile titanium dioxide | 8.1 |
| Natural clay | 28.5 |
| Magnesium silicate | 2.7 |
| Glass spheres (-45 mesh) | 30.1 |
| Solvents: | |
| Aliphatic hydrocarbon (15% aromatic, IBP 250°F, EP 285°F, KB 40) | 8.2 |
| Methylene chloride | 7.9 |
| Additives-Driers and additives | 0.5 |

This formulation has a pigment volume concentration of 52.4 and a solids content of 83.9.

EXAMPLE 17

| Material: | Percent by weight |
|---|---|
| Binder-Short oil epoxy ester having acid number no greater than 1 (70% epoxy-30% oil) (M.P. 130°C.) | 15.3 |
| Pigments | |
| Rutile titanium dioxide | 9.1 |
| Ground silica (1.5 microns) | 24.4 |
| Calcium sulfate (1.5 microns) | 21.3 |
| Magnesium silicate | 3.0 |
| Solvents: | |
| Toluene | 10.2 |
| Methylene chloride | 16.1 |
| Additives-Driers and additives | 0.6 |

This formulation has a pigment volume concentration of 59.4 and a solids content of 73.7.

EXAMPLE 18

| Material: | Percent by weight |
|---|---|
| Binder-Glycerol phthalic alkyd (47% glyceryl phthalate-53% oil) (10% Chinawood-90% soya) | 20.9 |
| Pigments | |
| Rutile titanium dioxide | 10.9 |
| Calcium sulfate (0.6 microns) | 25.3 |
| Calcined clay (1.5 microns) | 24.1 |
| Solvents: | |
| Aliphatic hydrocarbon (15% aromatic, IBP 250°F., EP 285°F., KB 40) | 11.3 |
| Methylene chloride | 7.1 |
| Additives-Driers and additives | 0.4 |

This formulation has a pigment volume concentration of 48.1 and a solids content of 81.6.

EXAMPLE 19

| Material: | Percent by weight |
|---|---|
| Binder-Phenolated alkyd (40% phthalic anhydried-4% soya oil) (MIL R-15190A) | 16.4 |
| Pigments | |
| Rutile titanium dioxide | 8.9 |
| Calcium sulfate (0.6 microns) | 20.8 |
| Ground silica (1.5 microns) | 26.5 |
| Magnesium silicate | 3.3 |
| Solvents: | |
| Aliphatic hydrocarbon (15% aromatic, IBP 250°F., EP 285°F., KB 40) | 16.4 |
| Methylene chloride | 7.3 |
| Additives-Driers and additives | 0.4 |

This formulation has a pigment volume concentration of 58.5 and a solids content of 76.3.

After the composition in accordance with the previous examples has been sprayed onto the roadway, glass beads can be immediately dropped onto the paint while it is still tacky so that the beads become partially embedded in the paint and it yields a line that is immediately retroreflective. The higher boiling solvent retards the setting up of the paint until it has reached the road and the glass beads have been dropped in.

Traffic can pass over the lines of the present invention within 1 to 2 minutes of being sprayed without any smearing or deformation of the lines. This differs from the prior systems due to the fact that in the prior systems as long as even fairly small percentages of solvent are retained the consistency of the film deposited is not stiff enough to let traffic pass over, even though the surface is dry to touch due to so-called skinning over. It is exactly the skinning over effect that traps solvent in the film and prevents any further reduction in drying time regardless of decreased solvent content and increased temperature. This is not true in the present invention which evaporates most solvent before deposition and in which the binder has a high consistency during deposition.

It will be obvious to those skilled in the art that various changes may be made without departing from the scope of the invention and the invention is not to be considered limited to what is described in the specification.

What is claimed is:

1. A traffic line paint capable of being sprayed when heated comprising by weight

| | Percent |
|---|---|
| Resin binder | 12–22 |

-Continued

| | Percent |
|---|---|
| Pigments | 50–69.4 |
| Low boilng solvents | 7–23 |
| Higher boiling solvents | 5–20 |
| Pigment volume concentration | 46–62 |
| Solids content | 70–85 |

said resin binder being selected from the group consisting of short and medium oil length glycerol or other polyfunctional alcohol phthalic alkyds having a polyfunctional alcohol phthalate resin content of 40–58% and an oil content of 60–42%, said low boiling solvents having a high solvency for the resin binder and a boiling range below the temperature at which the paint is sprayed, and said higher boiling solvents having a boiling range between 200–400° F.

2. A traffic line paint according to claim 1 wherein the major portion of said pigments is selected from the group consisting of ground silica, natural clay, calcined clay and calcium sulfate having at least 50% of their particles finer than 5 microns.

3. A traffic line paint according to claim 2 wherein said low boiling solvent is methylene chloride.

4. A traffic line paint according to claim 3 wherein said resin binder is a glycerol phthalic alkyd having a glyceryl phthalate resin content of 40–58% and an oil content of 60–42%.

5. A traffic line paint according to claim 4 wherein said higher boiling solvent is an aliphatic hydrocarbon, 15% aromatic, IBP 250° F., EP 285° F. and KB 40.

6. A method of applying a traffic line marker which is almost immediately dry upon deposition comprising pumping a traffic paint into a closed system under a fluid pressure of about 100–150 lbs./sq. inch, said traffic paint containing a resin binder, pigments, a higher boiling solvent, *a pigment volume concentration from 46–62%, a solids content of 70–85%* and from 7–23% of a low boiling solvent therein having a high solvency for the resin binder and a boiling range below the temperature at which the paint is to be sprayed, heating said paint to a temperature of about 140–250° F., releasing said heated paint through a spray orifice, applying auxiliary air pressure to said sprayed material immediately after leaving said orifice, and directing said sprayed stream onto a roadway surface.

7. A method according to claim 6 wherein reflectorizing glass spheres are applied onto said marker immediately after deposition onto said roadway surface.

8. A method according to claim 6 wherein said traffic paint is in accordance with claim 1.

9. A traffic line paint according to claim 1 wherein the proportions of the ingredients are as follows:

| | Percent |
|---|---|
| Resin binder | 14.0–21.7 |
| Pigments | 50.8–69.4 |
| Low boiling solvents | 7.1–16.1 |
| Higher boiling solvents | 8.2–18.5 |
| Pigment volume concentration | 46.7–60.1 |
| Solids Content | 71.3–83.9. |

10. A traffic line paint according to claim 1 wherein the proportions of ingredients are as follows:

| | Percent |
|---|---|
| Resin binder | 20.0 |
| Pigments | 56.4 |
| Low boiling solvents | 11.3 |
| Higher boiling solvents | 11.7 |
| Pigment volume concentration | 52.5 |
| Solids content | 77 . |

11. A traffic line paint in accordance with claim 10 having the following composition:

| | Percent |
|---|---|
| Glycerol phthalic alkyd (47% glceryl phthalate -53% oil) (10% Chinawood-90% soya) | 20.0 |
| Rutile titanium dioxide | 11.6 |
| Natural clay | 40.9 |
| Magnesium silicate | 3.9 |
| Aliphatic hydrocarbon (15% aromatic, IBP 250° F., EP 285°F., KB 40) | 11.7 |
| Methylene chloride | 11.3. |

* * * * *